United States Patent
Shorey

(10) Patent No.: US 10,009,215 B1
(45) Date of Patent: Jun. 26, 2018

(54) ACTIVE/PASSIVE MODE ENABLER FOR ACTIVE/ACTIVE BLOCK IO DISTRIBUTED DISK(S)

(71) Applicant: EMC Corporation, Hopkinton, MA (US)

(72) Inventor: Oliver Shorey, Bracknell (GB)

(73) Assignee: EMC IP Holding Company LLC, Hopkinton, MA (US)

( * ) Notice: Subject to any disclaimer, the term of this patent is extended or adjusted under 35 U.S.C. 154(b) by 1373 days.

(21) Appl. No.: 13/690,654

(22) Filed: Nov. 30, 2012

(51) Int. Cl.
*G06F 12/14* (2006.01)
*H04L 29/08* (2006.01)
*G06F 3/06* (2006.01)

(52) U.S. Cl.
CPC ...... *H04L 29/08549* (2013.01); *G06F 3/0622* (2013.01); *G06F 12/14* (2013.01)

(58) Field of Classification Search
CPC ... G06F 12/14; G06F 3/0622; H04L 29/08549
USPC .................................................. 711/111, 112
See application file for complete search history.

(56) References Cited

U.S. PATENT DOCUMENTS 8,046,446 B1 * 10/2011 Karr et al. ............... 709/223
2012/0159099 A1 * 6/2012 Lindamood et al. ......... 711/162

OTHER PUBLICATIONS

Microsoft Computer Dictionary—5th Edition; Microsoft Corporation; 2002; Microsoft Press; pp. 212, 213, 400-402, 702.*

* cited by examiner

*Primary Examiner* — Ann J Lo
*Assistant Examiner* — Eric T Loonan
(74) *Attorney, Agent, or Firm* — Anderson Gorecki LLP

(57) ABSTRACT

Consistency groups of federated data centers can be transitioned between active/active multi-writer and active/passive single writer operational modes. In the active/passive single writer mode one or more hosts in a first data center have Write access to a distributed storage resource, but a host in a second data center does not have Write access to that distributed storage resource. In the active/active multi-writer mode hosts in both the first and the second data center have Write access to the distributed storage resource. The active/passive single writer mode is used as a default mode. The active/active multi-writer mode is used when needed for scheduled or unscheduled but qualified events which require mobility, e.g., moving virtual machines or cluster groups.

24 Claims, 7 Drawing Sheets

ACTIVE/PASSIVE MODE ENABLER FOR ACTIVE/ACTIVE BLOCK IO DISTRIBUTED DISK(S)

CROSS-REFERENCE TO RELATED APPLICATIONS

NA

BACKGROUND OF THE INVENTION

The invention is generally related to data centers, and more particularly to operation of federated data centers with distributed clusters and volumes.

Data centers can be utilized by enterprises to provide a wide variety of services over a network. A data center typically includes clusters of host devices and data storage subsystems. Each data storage subsystem includes at least one storage array having multiple physical storage devices which can be organized as logical volumes. The host devices, which are typically types of servers, may support clustered applications to provide services to the clients by utilizing the data storage capabilities of the storage array. Further, one or more of the host devices may each support multiple virtualized servers (a.k.a. virtual machines or VMs) which run applications.

Various technologies may be implemented to facilitate data center disaster recovery. For example, RAID can be implemented locally within the data center in order to avoid service interruptions in the case of failure of a physical storage device, and remote site mirroring may be implemented so that data is backed up at a different data center which is at a different geographical location to avoid data loss in the case of natural disasters. Further, virtual machines or applications associated with a failed host can failover (restart) on another host in the cluster.

While it is well known for multiple data centers to coordinate in support of disaster recovery operations, until recently the assets of different data centers were not integrated in a manner which supported normal operations. EMC VPLEX differs from such typical prior art systems because it enables federation of information across multiple data centers such that hosts and volumes located in different data centers function as if located in the same data center, at least from the perspective of a client application. Further, such federation is practical even where the distance between the data centers is so great that synchronous write IOs would result in un-acceptable delay because in at least some configurations the system has active/active asynchronous capability, e.g., a volume can be shared by two VMs or physical nodes located at different data centers at distances typically associated with asynchronous topologies.

SUMMARY OF THE INVENTION

In accordance with an aspect, a computer program stored on a non-transitory computer readable medium comprises: in a network including a first data center and a second data center, the first data center including a first host and a storage resource, the second data center including a second host and a storage resource: logic which implements a first operational mode in which both storage resources are part of a distributed volume and the first host has Write access to the distributed volume and the second host does not have Write access to the distributed volume; logic which implements a second operational mode in which both storage resource are part of a distributed volume and the first host has Write access to the distributed volume and the second host has Write access to the distributed volume; and control logic which controls transitions between the first operational mode and the second operational mode.

In accordance with another aspect, an apparatus comprises: a first data center including a first host and a storage resource; a second data center including a second host and storage resource; and logic which: implements a first operational mode in which both storage resources are part of a distributed volume and the first host has Write access to the distributed volume and the second host does not have Write access to the distributed volume; implements a second operational mode in which both storage resource are part of a distributed volume and the first host has Write access to the distributed volume and the second host has Write access to the distributed volume; and controls transitions between the first operational mode and the second operational mode.

In accordance with another aspect a method comprises: in a network including a first data center and a second data center, the first data center including a first host and a storage resource, the second data center including a second host and storage resource: implementing a first operational mode in which both storage resources are part of a distributed volume and the first host has Write access to the distributed volume and the second host does not have Write access to the distributed volume; implementing a second operational mode in which both storage resources are part of a distributed volume and the first host has Write access to the distributed volume and the second host has Write access to the distributed volume; and transitioning between the first operational mode and the second operational mode.

An advantage associated with aspects is that federation and mobility are provided without unnecessarily exposing operations to the risk of being suspended due to link failure. For example, virtual machines or clustered applications can be moved and volumes can exchange roles when mobility is required due to scheduled or unscheduled but qualified circumstances. However, when mobility is not required the system can operate in a less susceptible active passive/mode.

Other features and advantages will become apparent in view of the detailed description and figures.

DETAILED DESCRIPTION

Certain aspects of the invention including but not limited to steps shown in flow diagrams may be implemented at least in-part with a computer program stored on non-transitory memory. The computer program is utilized by a physical processor device and possibly interfaces, transmitters, receivers and other hardware components in order to achieve the described functionality. The computer program may be distributed among multiple devices or operate on a single device.

For simplicity it is assumed that there is at minimum one extent per storage volume. Storage volumes may be referred to as disks, and it is assumed that there is a one-to-one mapping between virtual volumes and the underlying physical storage devices. Those of ordinary skill in the art will recognize that these are not limitations of the inventive concepts.

Figure 1:
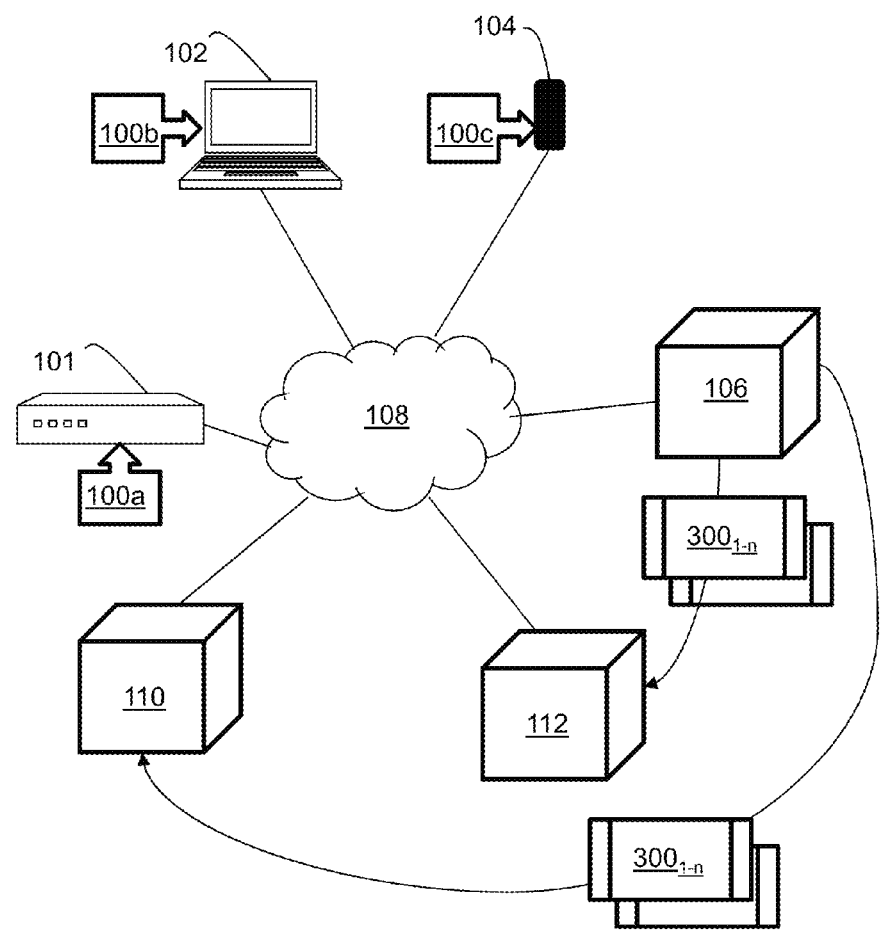
FIG. 1 illustrates a network of data centers and client devices.

FIG. 1 illustrates a simplified network environment in which client applications 100*a*, 100*b*, 100*c* running on any of various devices such as, without limitation, a server 101 or a user terminal such as a personal computer 102 or mobile phone 104, utilize services provided by one or more of data centers 106, 110, 112 via a network 108.

Figure 2:
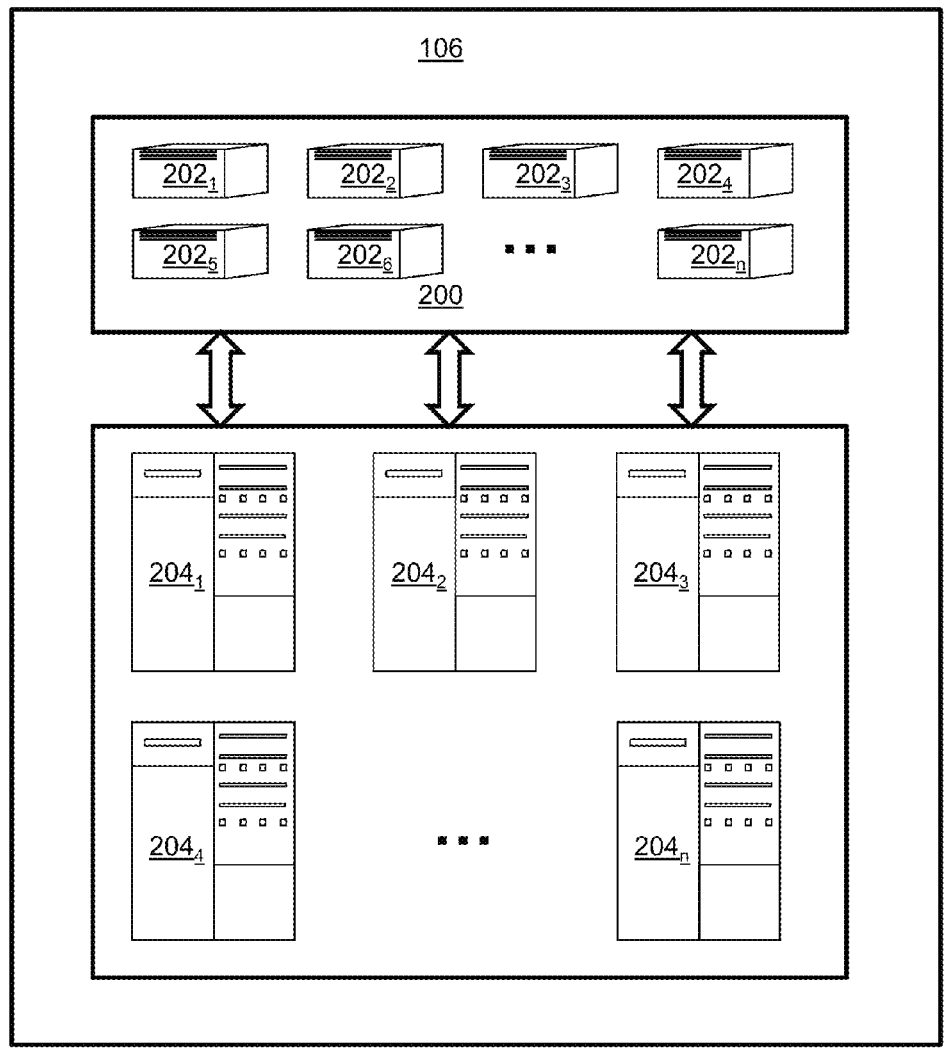
FIG. 2 illustrates a data center in greater detail.

Referring to FIG. 2, a data center such as data center 106 includes at least one cluster 200 of physical server devices $202_1$ through $202_n$. (hosts) and one or more data storage subsystems $204_1$ through $204_n$. The hosts and data storage subsystems are typically in communication via high bandwidth links. In general, the data storage subsystems respond to IO requests from the hosts.

Figure 3:
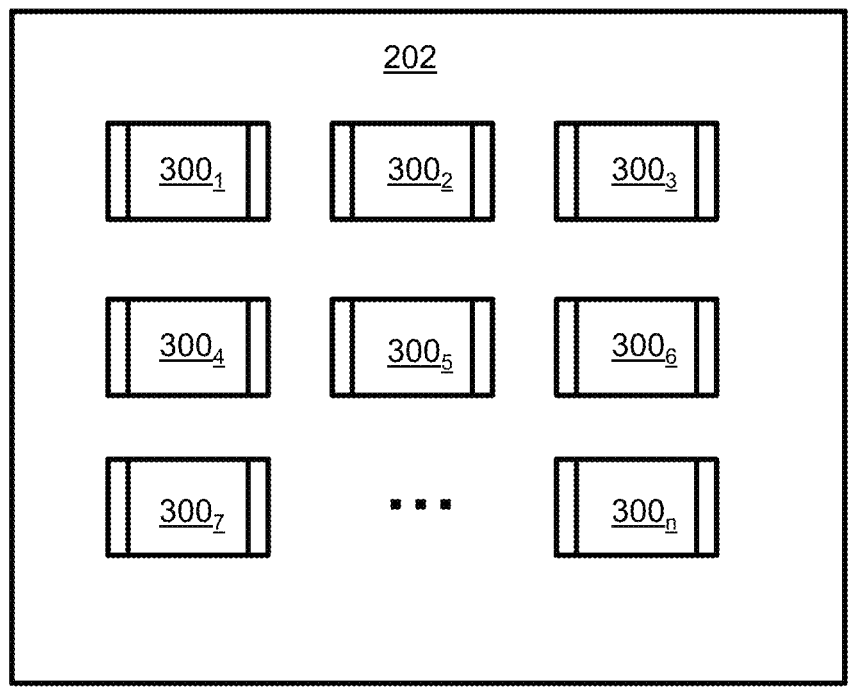
FIG. 3 illustrates a host device in greater detail.

Referring to FIG. 3, each host device 202 can run a plurality of virtual machines or cluster groups $300_1$ through $300_n$. Each virtual machine or group runs an application (or subset of an application) which provides services to the client applications. In particular, the virtual machines or groups on the host may run instances of the same applications or instances of different applications. A wide variety of applications may be run by the virtual machines or cluster groups. For example, and without limitation, it is known to use the virtual machines or groups as databases, application servers, file servers, and block servers. In a simple contextual example the client application can send an IO request to the application running on the virtual machine or cluster groups with which it is associated and the virtual machine or cluster group performs corresponding Read or Write operations by communicating with the storage array. Each virtual machine or cluster group may simultaneously provide services to multiple client applications. Furthermore, the requirements of client applications may change over time so the load on the virtual machine or cluster group tends to change over time. It follows that the load on the host, cluster, storage array and data center also change over time. Further, virtual machines or cluster groups may not typically exist indefinitely, but rather are instantiated and inactivated in response to need or other factors.

Figure 4:
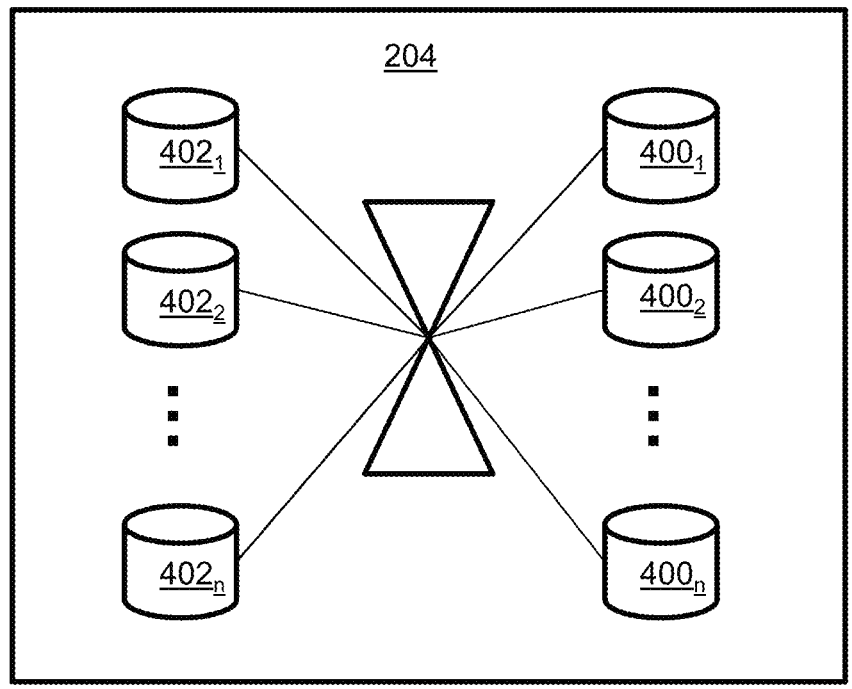
FIG. 4 illustrates mapping between logical volumes and physical storage devices.

Referring to FIG. 4, each data storage subsystem 204 includes an array of physical storage devices $400_1$ through $400_n$. The array may include multiple types of physical storage devices with different performance characteristics, and the devices may be arranged in hierarchical tiers based on those performance characteristics. The physical storage devices are typically organized into logical volumes or LUNs $402_1$ through $402_n$.

Figure 5:
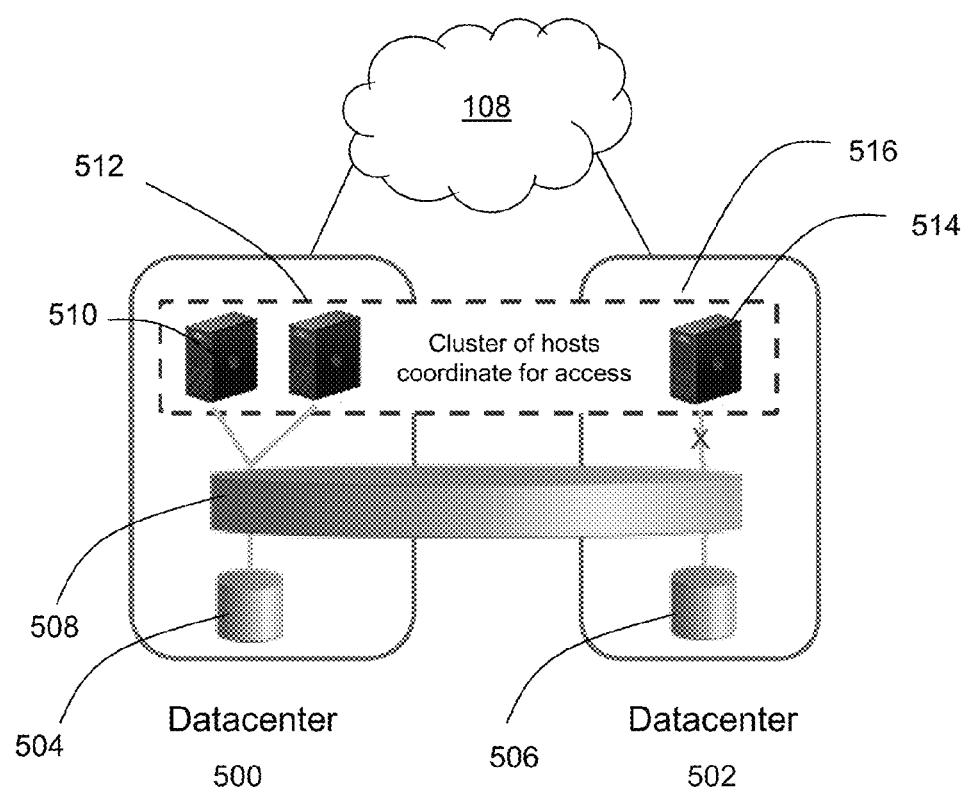
FIG. 5 illustrates federated data centers in active/passive mode.

FIG. 5 illustrates federated data centers 500, 502 in active/passive mode. The data centers are in communication via a network 108. In this mode a volume 504 at primary data center 500 is replicated to volume 506 at secondary data center 502 via distributed volume 508. Access to the distributed volume 508 in this mode is available only to host devices at the primary data center 500. In the illustrated example two hosts 510, 512 of a cluster 516 contend for the distributed volume 508 at the primary data center. Host 514 also resides within cluster 516, but has no access to the distributed volume 508. The hosts coordinate locking via the host cluster 516 to ensure that the distributed volume 508 remains consistent. Since host 514 has no access to distributed volume 508, this guarantees single writer to the distributed volume from a data center perspective as writes can only occur from hosts at datacenter 500. In this mode the distributed volume would be written to via only one datacenter at any point in time.

Figure 6:
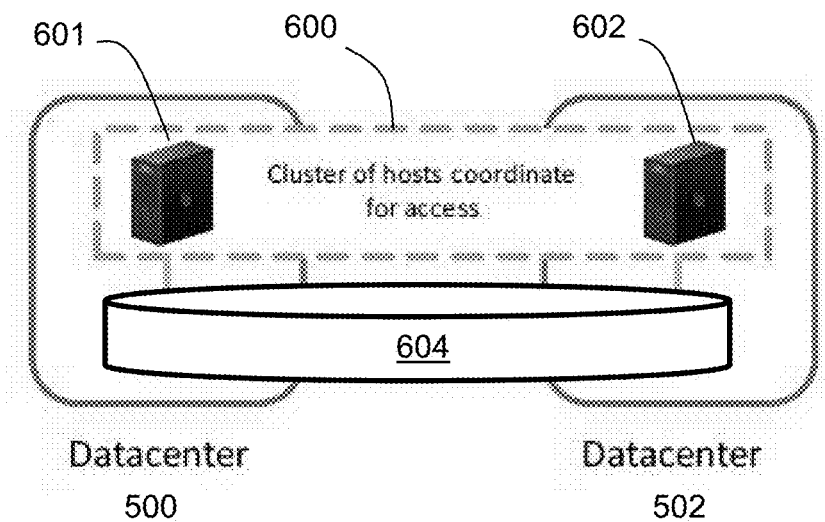
FIG. 6 illustrates an active/active mode of the federated data centers.

FIG. 6 illustrates an active/active mode of the federated data centers 500, 502. In this mode a distributed cluster 600 of hosts includes host device 601 in datacenter 500 and a host device 602 in datacenter 502. Further, physical storage devices of both datacenters are organized into a distributed volume 604, and the host devices in both datacenters have access to the distributed volume, including underlying physical storage devices at both data centers. The hosts do not generally recognize a distinction between the active/passive and active/active modes. In the active/active mode the hosts still coordinate locking to ensure data consistency from the application perspective. Additionally in this example the host IO pattern choices are identical to the previous example whereby a cluster will be either performing active/passive or active/active (single or multi-writer) IO patterns.

Asynchronous write-back cache is used when transmission delay between data centers is significant. The transmission delay term is typically dominated by the physical distance between the data centers, and data centers may be widely geographically dispersed. In the asynchronous write-back mode a copy of a Write IO is maintained in the cache at one data center and immediately acknowledged back to the host (write-back). The data in the cache is then asynchronously written (destaged) to the local back end storage array and to the storage array of the remote data center.

Consistency can be maintained at levels ranging from the extent level to the data center level, but typically is maintained within one or more logical volumes organized into a consistency group. In this case consistency is not necessarily maintained between consistency groups. Applications that require federated consistency between them are typically placed into the same consistency group. This can be made up of a single host, or multiple hosts with back end storage from one or many arrays (if using multiple arrays then consistency is maintained across arrays). Delta sets are used within each consistency group to maintain write order fidelity and preserve dependant writes within each delta. A delta set is analogous to an open container in cache that fills up with write IOs for a given time period or size threshold for a group of multiple storage devices. Once this time period or size threshold has passed then this delta set is closed, and the next empty delta is opened to collect the next cycle of write IO for a given time period. The procedure continues iteratively. Data consistency within the delta set is maintained on the logical open and closed boundaries. Once a delta set is closed it is written out (applied) in its entirety to the data image on the back end storage array. Each delta set is written in the same chronological order in which it was created to ensure a consistent image of data. Only after the previous delta set has been written to the back end can the next delta set be written.

While the asynchronous write-back cache mode helps to support federation and active/active multi-writer, certain complications are presented. For example, the data behind the cache layer (on the back end array) can be at a different time point than the data in the cache. Further, both data centers may lag because both can be replication sources and targets when hosts are writing to the same consistency group at multiple data centers (known as multi-writer mode). Also, at certain time intervals the data being written to the back end array may not necessarily be written in the same IO order in which the data was originally received, thereby inhibiting use of some replication techniques on the back end array. Due to these complications it may be necessary to temporarily halt operations associated with the distributed cluster and distributed volume at both data centers in response to a cluster failure at either data center or failure of the link between the data centers. In active/passive single writer mode this is not the case and only the passive location lags behind the active location, therefore operations will only be halted if the active cluster or datacenter fails.

Figure 7:
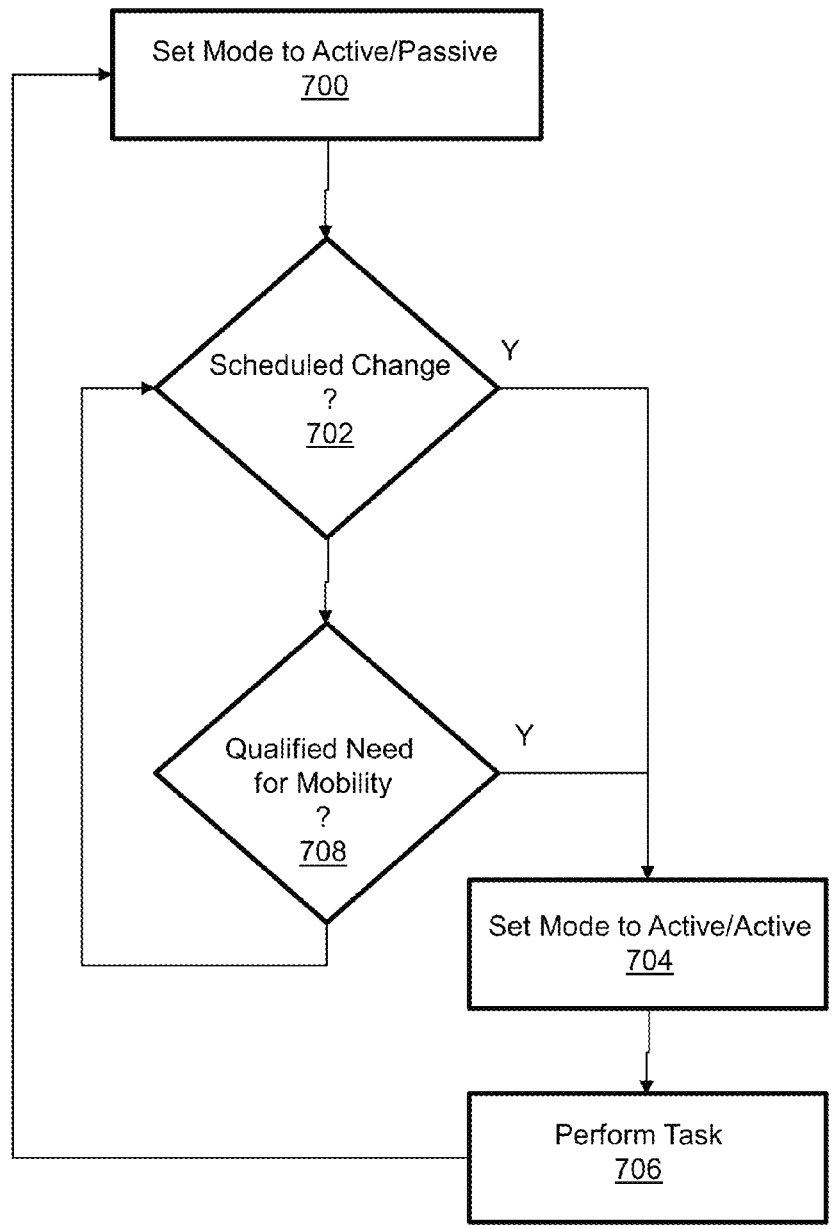
FIG. 7 illustrates controlling transitions between modes.

Referring to FIGS. 1 and 7, transitions between modes are controlled in order to mitigate the possibility of halting operations at both federated data centers in the event of a network partition. The operational mode is set to active/passive single writer as a default at step 700. The system operates in the default mode until certain conditions are met. For example, if there is a scheduled change as determined at 702 then the operational mode is set to active/active multi-writer in step 704. One example of a scheduled change is "follow the sun" migration. In such a scenario the enterprise would schedule movement of virtual machines or cluster groups $300_{1-n}$ between data centers 106 and 112 based on time of day, day of week, etc., in order to accommodate corresponding predictable demand changes. For example, data centers on different continents or in different states might be more highly utilized during regular working hours so virtual machines or cluster groups might be moved to the data center that is more local to the activity. In context, over a 24 hour cycle a first data center 106 could be active and a second data center 112 passive during the first 12 hours, during which time the virtual machines or cluster groups are run at data center 106. Then in the second 12 hours data center 112 is active and data center 106 is passive, during which time the virtual machines or cluster groups are run at data center 112. The 12 hour periods are approximate because during a transition phase between those periods the mode is changed to active/active in order to migrate the virtual machines or cluster groups between data centers. Note that the active/passive and single writer/multi-writer roles are toggled as part of the migration, e.g., data center 106 being the active site in the first 12 hours and the passive site in the second 12 hours. Once the mobility task is completed in step 706 (in this case the virtual machine or cluster group migration), the mode is returned to active/passive single writer in step 700. The mode may also be changed in response to unscheduled but qualified need for mobility as indicated by step 708. For example, virtual machines or cluster groups $300_{1-n}$ might be moved from data center 106 to data center 110 because data center 106 is in the projected path of a hurricane. As with the scheduled mode change, the unscheduled mode change to active/active multi-writer mode is only maintained for the time required to perform the task, following which the mode is set to single writer active/passive.

The mode transition control described above may be implemented at any level of granularity. For example, it may be implemented at the data center level, consistency group level, volume level and extent level. Furthermore, at any of these levels a mode may be locked such that it is not changed without manual intervention. For example, a consistency group could be locked in active/passive mode by specifying no scheduled changes and no need for mobility that would be qualified to automatically trigger mode change. Consequently, a scheduled mode change or mode change based on qualified need for a first consistency group does not necessarily imply a mode change for a second consistency group.

While the invention is described through the above examples, it will be understood by those of ordinary skill in the art that a wide variety of modifications to and variations of the illustrated embodiments may be made without departing from the inventive concepts herein disclosed. Moreover, while the embodiments are described in connection with various illustrative structures, one skilled in the art will recognize that the system may be embodied using a wide variety of specific structures, and features of different embodiments may be used in a variety of combinations. Accordingly, the invention should not be viewed as limited except by the scope and spirit of the appended claims.

What is claimed is:

1. A computer program stored on a non-transitory computer readable medium comprising:
   in a network including a first data center and a second data center, the first data center including a first host and a storage resource, the second data center including a second host and storage resource:
   logic which implements a first operational mode in which both storage resources are part of a distributed volume and the first host has write access to the distributed volume and the second host does not have write access to the distributed volume;
   logic which implements a second operational mode in which both storage resources are part of the distributed volume and the first host has write access to the distributed volume and the second host has write access to the distributed volume; and
   control logic which controls transitions between the first operational mode and the second operational mode.

2. The computer program of claim 1 wherein the control logic utilizes the first operational mode as a default.

3. The computer program of claim 1 wherein the control logic prompts transition from the first operational mode to the second operational mode in response to a scheduled event.

4. The computer program of claim 3 wherein at least one virtual machine or cluster group is moved from the first data center to the second data center in the second operational mode, and wherein the control logic prompts transition from the second operational mode to the first operational mode after the virtual machine or cluster group has been moved or is changed automatically based on detection of input/output operations.

5. The computer program of claim 1 wherein the control logic prompts transition from the first operational mode to the second operational mode in response to an unscheduled but qualified need for mobility.

6. The computer program of claim 5 wherein at least one virtual machine or cluster group is moved from the first data center to the second data center in the second operational mode, and wherein the control logic prompts transition from the second operational mode to the first operational mode after the virtual machine or cluster group has been moved or is changed automatically based on detection of input/output operations.

7. The computer program of claim 1 including logic which implements a third operational mode in which both storage resources are part of the distributed volume and the first host does not have write access to the distributed volume and the second host has write access to the distributed volume.

8. The computer program of claim 1 wherein the control logic separately controls transitions between the first operational mode and the second operational mode for individual consistency groups.

9. An apparatus comprising:
  a first data center including a first host and a storage resource;
  a second data center including a second host and a storage resource; and
  logic which:
    implements a first operational mode in which both storage resource are part of a distributed volume and the first host has write access to the distributed volume and the second host does not have write access to the distributed volume;
    implements a second operational mode in which both storage resources are part of a distributed volume and the first host has write access to the distributed volume and the second host has write access to the distributed volume; and
    controls transitions between the first operational mode and the second operational mode.

10. The apparatus of claim 9 wherein the logic utilizes the first operational mode as a default.

11. The apparatus of claim 9 wherein the logic prompts transition from the first operational mode to the second operational mode in response to a scheduled event.

12. The apparatus of claim 11 wherein at least one virtual machine or cluster group is moved from the first data center to the second data center in the second operational mode, and wherein the logic prompts transition from the second operational mode to the first operational mode after the virtual machine or group has been moved or is changed automatically based on detection of input/output operations.

13. The apparatus of claim 9 wherein the logic prompts transition from the first operational mode to the second operational mode in response to an unscheduled but qualified need for mobility.

14. The apparatus of claim 13 wherein at least one virtual machine or cluster group is moved from the first data center to the second data center in the second operational mode, and wherein the logic prompts transition from the second operational mode to the first operational mode after the virtual machine or cluster group has been moved or is changed automatically based on detection of input/output operations.

15. The apparatus of claim 9 wherein the logic implements a third operational mode in which both storage resources are part of the distributed volume and the first host does not write access to the distributed volume and the second host has write access to the distributed volume.

16. The apparatus of claim 9 wherein the logic separately controls transitions between the first operational mode and the second operational mode for individual consistency groups.

17. A method comprising:
  in a network including a first data center and a second data center, the first data center including a first host and a storage resource, the second data center including a second host and storage resource:
    implementing a first operational mode in which both storage resources are part of a distributed volume and the first host has write access to the distributed volume and the second host does not have write access to the distributed volume;
    implementing a second operational mode in which both storage resources are part of a distributed volume and the first host has write access to the distributed volume and the second host has write access to the distributed volume; and
    transitioning between the first operational mode and the second operational mode.

18. The method of claim 17 including utilizing the first operational mode as a default.

19. The method of claim 17 including prompting transition from the first operational mode to the second operational mode in response to a scheduled event.

20. The method of claim 19 including moving at least one virtual machine or cluster group from the first data center to the second data center in the second operational mode, and prompting transition from the second operational mode to the first operational mode after the virtual machine or cluster group has been moved or is changed automatically based on detection of input/output operations.

21. The method of claim 17 including prompting transition from the first operational mode to the second operational mode in response to an unscheduled but qualified need for mobility.

22. The method of claim 21 including moving at least one virtual machine or cluster group from the first data center to the second data center in the second operational mode, and prompting transition from the second operational mode to the first operational mode after the virtual machine or cluster group has been moved or is changed automatically based on detection of input/output operations.

23. The method of claim 17 including implementing a third operational mode in which both storage resources are part of the distributed volume and the first host does not write access to the distributed volume and the second host has write access to the distributed volume.

24. The method of claim 17 including separately controlling transitions between the first operational mode and the second operational mode for individual consistency groups.

* * * * *